United States Patent [19]

Nishiyama et al.

[11] Patent Number: 4,691,004

[45] Date of Patent: Sep. 1, 1987

[54] COPOLYMERIZATION OF LACTAM WITH DIENE POLYMER HAVING AMINO OR IMINO END GROUPS

[75] Inventors: Masao Nishiyama; Yasuo Hirano, both of Hirakata, Japan

[73] Assignee: Allied Corporation, Morris Township, Morris County, N.J.

[21] Appl. No.: 789,991

[22] Filed: Oct. 22, 1985

[30] Foreign Application Priority Data

Oct. 30, 1984 [JP] Japan .................................. 59-226941

[51] Int. Cl.[4] ........................ C08G 69/14; C08G 69/18
[52] U.S. Cl. .................................... 528/323; 525/184; 525/420; 525/426; 528/312; 528/315; 528/326
[58] Field of Search ............... 528/323, 312, 315, 326; 525/184, 420, 426

[56] References Cited

U.S. PATENT DOCUMENTS

| | | | |
|---|---|---|---|
| 3,017,391 | 1/1962 | Mottus et al. .......................... | 260/78 |
| 3,366,608 | 1/1968 | Lincoln et al. ......................... | 260/78 |
| 3,862,262 | 1/1975 | Hendrick et al. ............. | 260/857 PG |
| 3,944,629 | 3/1976 | Hedrick et al. .............. | 260/857 PE |
| 3,993,709 | 11/1976 | Hedrick et al. .............. | 260/857 PE |
| 4,017,558 | 4/1977 | Schmidt et al. .................. | 260/876 B |
| 4,031,164 | 6/1977 | Hedrick et al. .............. | 260/857 PG |
| 4,034,015 | 7/1977 | Hedrick et al. .............. | 260/857 PG |
| 4,336,344 | 6/1982 | Craigie ..................................... | 525/31 |
| 4,414,362 | 11/1983 | Lenke et al. ......................... | 525/178 |
| 4,448,904 | 5/1984 | Dominguez et al. ................ | 521/160 |
| 4,474,900 | 10/1984 | Dominguez et al. ............... | 521/110 |
| 4,474,901 | 10/1984 | Dominguez ........................... | 521/163 |
| 4,487,920 | 12/1984 | Akkapeddi .......................... | 528/323 |
| 4,490,520 | 12/1984 | Ogasa et al. ......................... | 528/315 |
| 4,499,254 | 2/1985 | Dominguez et al. ................. | 528/49 |
| 4,513,133 | 4/1985 | Dominguez et al. ................. | 528/49 |
| 4,555,566 | 11/1985 | Arita et al. ........................... | 528/323 |
| 4,567,226 | 1/1986 | Grigo et al. ......................... | 525/184 |

OTHER PUBLICATIONS

Derwent Abstract; J52057294-A (7725): J77043756-B (7747).
Derwent Abstract; J51060293-A (7628): J77015319-B (7721).

*Primary Examiner*—Harold D. Anderson
*Attorney, Agent, or Firm*—Richard A. Negin; Patrick L. Henry

[57] ABSTRACT

A process for producing a lactam copolymer, which comprises copolymerizing an omega-lactam and a diene polymer having an amino or imino group at molecular ends by the action of an alkaline catalyst and a polyfunctional co-catalyst, the proportions of the components satisfying the following equations (I) and (II)

$$a/c > 1 \qquad (I)$$

$$b/c > 1 \qquad (II)$$

wherein a, b and c represent the equivalent weights of the alkaline catalyst, the polyfunctional co-catalyst and the diene polymer, respectively, per equivalent of omega-lactam.

9 Claims, No Drawings

COPOLYMERIZATION OF LACTAM WITH DIENE POLYMER HAVING AMINO OR IMINO END GROUPS

BACKGROUND OF THE INVENTION

1. Field of the Invention

This invention relates to a process for producing a lactam copolymer having excellent impact strength by copolymerizing omega-lactam and a diene polymer in accordance with the technique of alkali polymerization of omega-lactam.

This invention also relates to a novel lactam copolymer having excellent impact strength produced by copolymerizing omega-lactam and a diene polymer in accordance with the technique of alkali polymerization omega-lactam.

This invention further relates to an article, particularly an automobile part, composed of the aforesaid copolymer.

2. Description of the Prior Art

The technique of polymerizing omega-lactam by the action of an aklaline catalyst and a co-catalyst, i.e. the so-called alkali polymerization method, is known. A polyamide obtained by this method has excellent mechanical strengths such as tensile strength, flexural strength and initial modulus, and is used as machine parts and industrial materials. However, it cannot be used in applications requiring flexibility since it has low elongation and impact strength and is hard and brittle.

Some methods have previously been proposed for the production of a polyamide/diene-type polymer copolymer in an attempt to improve the impact strength of the polyamide obtained by the alkali polymerization of omega-lactam.

For example, Japanese Patent Publication No. 15319/1977 discloses a process for producing a polyamide/polybutadiene copolymer having impact strength which comprises copolymerizing omega-lactam with a butadiene homopolymer or a copolymer of butadiene and a vinyl compound each having hydroxyl groups at both molecular ends by the action of an alkaline catalyst and a polyisocyanate. The copolymer obtained by this process, however, has inferior heat resistance since it contains a urethane linkage resulting from the reaction of the polyisocyanate and polybutadiene in the molecular chains. Another defect is that because the urethane linkage is readily hydrolyzed by the action of the alkaline catalyst, an increase in the amount of the polybutadiene in the polymer does not lead to a significant increase in the impact strength of the resulting copolymer.

Japanese Patent Publication No. 43756/1977 discloses a process for producing a polyamide/polybutadiene copolymer having impact strength which comprises polymerizing omega-lactam by the action of an alkaline catalyst and a polymerization activator obtained by the reaction of a butadiene homopolymer or butadiene/acrylonitrile copolymer having carboxyl groups at molecular ends with a diisocyanate. This process, however, requires an extra step of producing the polymerization activator from a carboxyl-containing butadiene polymer and a diisocyanate prior to the alkali polymerization of omega-lactam. The resulting polymerization activator has a very high viscosity and lends itself to difficult handling so that, for example, a long period of time is required in dissolving it in omega-lactam. This is industrially disadvantageous. Moreover, the impact strength of the resulting copolymer is not as high as is satisfactory.

U.S. Pat. No. 4,031,164 discloses a process for producing a lactam/polyol/polyacyl lactam terpolymer having excellent impact strength by utilizing the method of alkali polymerization of omega-lactam.

U.S. Pat. No. 4,490,520 discloses a process for producing a polyamide having improved impact strength, which comprises polymerizing lactam in the presence of an alkaline catalyst and the reaction product of a polyfunctional co-catalyst and a polyoxyalkyleneamine.

Molded articles prepared from the polyamides produced by these processes have the defect of being limited in uses because they have a high rate of water absorption and change greatly in size within short periods of time owing to water absorption.

SUMMARY OF THE INVENTION

It is an object of this invention is to provide a polyamide/diene polymer copolymer being free from the defects of the aforesaid prior processes and having excellent impact strength and a low rate of water absorption.

Another object of this invention is to provide a novel polyamide/diene polymer copolymer being free from the defects of the aforesaid prior processes and having excellent impact strength and a low rate of water absorption.

Still another object of this invention is to provide article composed of the aforesaid copolymer.

The object of this invention is achieved by a process for producing a lactam copolymer, which comprises copolymerizing an omega-lactam and a diene polymer having an amino or imino group at molecular ends by the action of an alkaline catalyst and a polyfunctional co-catalyst, the proportions of the components satisfying the following expressions (I) and (II)

$$a/c > \tfrac{1}{4} \quad (I)$$

$$b/c > 1 \quad (II)$$

wherein a, b and c represent the equivalent weights of the alkaline catalyst, the polyfunctional co-catalyst and the diene polymer, respectively, per equivalent of omega-lactam.

The other object of this invention is achieved by a lactam copolymer produced by copolymerizing an omega-lactam and a diene polymer having an amino or imino group at molecular ends by the action of an alkaline catalyst and a polyfunctional co-catalyst, the proportions of the components satisfying the following expressions (I) and (II)

$$a/c > \tfrac{1}{4} \quad (I)$$

$$b/c > 1 \quad (II)$$

wherein a, b and c represent the equivalent weights of the alkaline catalyst, the polyfunctional co-catalyst and the diene polymer, respectively, per equivalent of omega-lactam.

The still other object of this invention is achieved by an article composed of the aforesaid copolymer.

DETAILED DESCRIPTION OF THE PREFERRED EMBODIMENTS

The invention will now be described in detail.

The omega-lactam used in this invention is preferably an omega-lactam having 4 to 12 carbon atoms. Specific examples of the omega-lactam include gamma-butyrolactam, delta-valerolactam, epsilon-caprolactam, omega-enantholactam, omega-capryllactam, omega-undecanolactam and omega-lauryllactam. They may be used singly or in combination.

The alkaline catalyst may include all alkaline catalysts used in the known alkali polymerization of omega-lactams. Specific examples are alkali metals, alkaline earth metals, hydrides, oxides, hydroxides, carbonates, alkylation products and alkoxides of these metals, Grignard's reagent, sodium naphthalene, and the reaction products of these metals or metal compounds with omega-lactams, such as sodium or potassium salts of omega-lactams. Of these, the sodium or potassium salts of omega-lactams are preferred.

The alkaline catalyst is used in such a proportion that the ratio of the equivalent weight (a) of the alkaline catalyst per equivalent of the omega-lactam to the equivalent weight (c) of the diene polymer per equivalent of the omega-lactam satisfies the following equation (I)

$$a/c > 1 \tag{I}$$

prefrably the following equation (III)

$$5 > a/c > 1 \tag{III}$$

more preferably the following equation (V)

$$3 > a/c > 1 \tag{V}$$

If the proportion of the alkaline catalyst used is smaller than the lower limit of equation (I), the rate of polymerization becomes slow and the polymerization conversion is low. Hence, lactam copolymers of practical utility cannot be obtained. If, on the other hand, the proportion of the alkaline catalyst exceeds the specified upper limit of expression (III), the molecular weight of the resulting lactam copolymer is not sufficient, and it is difficult to obtain lactam copolymers of practical utility.

The equivalent weight (c) of the diene polymer per equivalent of the omega-lactam is 1 when 1 mole of the diene polymer having one amino or imino group at a molecular end is used per mole of the omega-lactam, and is 2 when 1 mole of the diene polymer having two amino or imino groups at the molecular ends is used.

All polyfunctional compounds used in the known alkali polymerization may be used as the polyfunctional co-catalyst. Specific examples include polyisocyanates such as toluene diisocyanate, 4,4'-diphenylmethane diisocyanate, hexamethylene diisocyanate, xylylene diisocyanate, polymethylene polyphenyl polyisocyanate and carbodiimide-modified diisocyanates; carbamidolactams such as hexamethylene-1,6-bis-carbamidocaprolactam, 4,4'-diphenylmethane-bis-carbamidocaprolactam, N-phenyl N'-isopropyl-p-phenylene-bis-carbamidocaprolactam and N,N'-diphenyl-p-phenylene-bis-carbamidolactam; acid chlorides such as terephthaloyl chloride, adipoyl chloride and sebacoyl chloride; and polyacyl lactams such as adipoyl-bis-caprolactam and terephthaloyl-bis-caprolactam. Of these, the diisocyanates and carbamidolactams are preferred.

The polyfunctional co-catalyst is used in such a proportion that the ratio of the equivalent weight (b) per equivalent of the omega-lactam to the equivalent weight (c) of the diene polymer per equivalent of the omega-lactam satisfies the following equation (II)

$$b/c > 1 \tag{II}$$

preferably the following equation (IV)

$$6 > b/c > 1 \tag{IV}$$

more preferably the following equation (VI)

$$4 > b/c > 1 \tag{VI}$$

If the proportion of the polyfunctional co-catalyst used is below the lower limit of equation (II), the rate of polymerization is slow, and the polymerization conversion is low. Hence, lactam copolymers of practical utility cannot be obtained. On the other hand, if the proportion of the polyfunctional co-catalyst exceeds the upper limit of equation (IV), the molecular weight of the resulting lactam copolymer is not sufficient, and it is difficult to obtain lactam copolymers of practical utility.

Examples of the diene polymer constituting the main chain of the diene polymer having an amino or imino group at the molecular ends include a butadiene homopolymer, an isoprene homopolymer, a butadiene/styrene copolymer, a butadiene/isoprene copolymer, and a butadiene/acrylonitrile copolymer. Those diene polymers which are liquid at least at the melting temperatures of the omega-lactams are preferred. These diene polymers may dissolve in the molten omega-lactams, or may be substantially uniformly dispersed in liquid form in the molten omega-lactams.

A specific example of the liquid diene polymer is a copolymer of butadiene and acrylonitrile containing imino groups at both molecular ends and having an average molecular weight of 3,000 to 5,000. It is available, for example, from Ube Industries, Ltd. under trademarks HYCAR® ATMN 1300×8, HYCAR® ATBN 1300×13, HYCAR® ATBN 1300×16, and HYCAR® ATBN 1300×21.

The number average molecular weight of these diene polymers is preferably not more than 20,000, more preferably 400 to 10,000, and above all 500 to 5,000 in view of the ease of dissolution im omega-lactams.

The amount of the diene polymer used is preferably 1 to 60% by weight, more preferably 3 to 50% by weight, especially preferably 5 to 30% by weight, based on the weight of the omega-lactam. If its amount is smaller than the lower limit specified, it is difficult to impart sufficient impact strength to the resulting lactam copolymer. Even if the amount is increased beyond the upper limit, no great difference in effect is noted, and rather the flexural strength or flexural modulus of the resulting lactam copolymer is greatly reduced. Thus, amounts above the upper limit are not practical.

The alkali copolymerization of the omega-lactam and the diene polymer in accordance with this invention can be carried out by a known method, for example, the melt polymerization method.

The polyfunctional co-catalyst and the diene polymer may be separately added to the copolymerization reaction system, or may be used as a reaction product prepared by mixing and reacting them prior to the copolymerization. The reaction of the polyfunctional co-catalyst with the diene polymer proceeds readily by contacting them with each other at a temperature above room temperature in the presence or absence of an inert organic solvent.

The polymerization temperature is preferably above the melting point of the omega-lactam to be polymerized but below the melting point of the resulting lactam copolymer. Usually, the polymerization time is not more than 2 hours.

In the present invention, the omega-lactam may be copolymerized in the presence of plasticizers, fillers, fibers, blowing agents, dyes or pigments, and stabilizers such as an antioxidant which do not substantially inhibit the polymerization reaction. Preferred plasticizers are, for example, N-alkylpyrrolidones and dialkylimidazolidinones. Specific examples of the fillers are calcium carbonate, wollastonite, kaolin, graphite, gypsum, feldspar, mica, asbestos, carbon black, and molybdenum disulfide. Specific examples of the fibers include milled glass fibers, fibrous magnesium compounds, potassium titanate fibers, mineral fibers, graphite fibers, boron fibers and steel fibers. The amount of the fillers and/or fibers is usually 2 to 50% by weight based on the weight of the omega-lactam. Specific examples of the blowing agents are benzene, toluene and xylene, and the amount of the blowing agents is usually 1 to 15% by weight based on the weight of the omega-lactam.

The present invention is useful as a method of producing molded articles, such as rods, plates, pipes and automobile parts, directly from omega-lactams by a casting method or a reactive injection molding method. It is also possible to form chips from the lactam copolymer obtained by this invention and mold the chips into various molded articles, sheets and fibers by injection molding, extrusion, etc.

According to this invention, lactam copolymers having high impact strength can be obtained without a decrease in polymerization conversion by using the diene polymer having an amino or imino group at molecular ends wich has not been utilized heretofore. It is well known that when the anionic polymerization of omega-lactam is carried out in the presence of a compound having active hydrogen, for example an amino group, the polymerization conversion decreases. In view of this, the present invention is characterized by the fact that the polymerization conversion of the omega-lactam is not decreased in spite of using a polymer having an amino group. The lactam copolymers obtained by this invention do not undergo hydrolysis by the action of the alkaline catalyst.

The process of this invention does not require the production of a polymerization initiator from thepolyfunctional co-catalyst and the diene polymer having an amino or imino group prior to the alkali polymerization of the omega-lactam. Furthermore, the resulting lactam copolymer is characterized by a low rate of water absorption.

WORKING EXAMPLES

The following Examples and Comparative Examples illustrate the present invention more specifically.

The rate of polymerization denotes the time required from the beginning of the mixing of monomer liquid until the mixed monomer liquid became non-flowable when the monomer liquid was mixed at 100° C. and then polymerized at 160° C.

The polymerization conversion was determined as follows: About 5 g of the lactam copolymer were cut to a size of less than 0.2 mm on a lathe, extracted for 8 hours with chloroform at 60° to 61.2° C., and then dried fully. The weight of the dried sample was measured. The conversion was determined from the ratio of the measured weight to the weight of the polymer before the chloroform extraction.

The tensile strength, tensile modulus, flexural strength and flexural modulus were measured in accordance with ASTM D-638.

The Izod impact strength (notched) was measured in accordance with ASTM D-256 using a sample in the absolutely dried state at a temperature of 23° C. and a relative humidity of 65%.

EXAMPLE 1

Sodium methylate powder having a purity of 95% (4.92 g) was added to 500 g of substantially anhydrous epsilon-caprolactam heated at 110° C. The by-product methanol was distilled off under reduced pressure to prepare a solution containing 11.69 g of sodium caprolactam (component A).

Fifty grams of HYCAR ® ATBN 1300×16 (amine equivalent 900, acrylonitrile content 16.5%) and 23.6 g of hexamethylene-1,6-bis-carbamidocaprolactam (HMBCCL) were added to 450 g of substantially anhydrous caprolactam heated at 100° C., and the mixture was stirred at the same temperature in a nitrogen gas atmosphere to form component B.

The components A and B were mixed with stirring. The mixture was immediately placed in a mold preheated at 150° C. and having an inner capacity of 1800 cc (size: 300 mm long, 300 mm wide, 20 mm thick). The mold was maintained for about 10 minutes in an oil bath at 150° C. The molded article was then taken out.

The rate of polymerization was measured by sampling part of the mixture in a test tube.

The tensile strength, tensile modulus, flexural modulus, flexural modulus, Izod impact strength (notched) and polymerization conversion of the resulting polymer were measured by using specimens obtained by machining the molded article.

The results are shown in Table 1.

COMPARATIVE EXAMPLE 1

Example 1 was repeated except that HYCAR ® ATBN 1300×16 was not added to component B. The results are shown in Table 1.

COMPARATIVE EXAMPLE 2

Example 1 was repeated except that the amount of sodium caprolactam in component A was changed to 1.50 g. The results are shown in Table 1.

COMPARATIVE EXAMPLE 3

Example 1 was repeated except that the amount of HMBCCL in component B was changed to 9.80 g. The results are shown in Table 1.

TABLE 1

| | a/c | b/c | Rate of polymerization (seconds) | Polymerization conversion (%) | Tensile strength (kg/cm$^2$) | Tensile modulus (kg/cm$^2$) | Flexural strength (kg/cm$^2$) | Flexural modulus (kg/cm$^2$) | Izod impact strength (notched) (kg-cm/cm) |
|---|---|---|---|---|---|---|---|---|---|
| Example 1 | 1.55 | 2.17 | 70 | 96.0 | 776 | 29600 | 1060 | 27000 | 8.1 |
| Comparative Example 1 | — | — | 65 | 96.2 | 800 | 30000 | 1100 | 35000 | 3.5 |
| Comparative Example 2 | 0.20 | 2.17 | 600 | 81.3 | Measurement impossible | Measurement impossible | Measurement impossible | Measurement impossible | Measurement impossible |
| Comparative Example 3 | 1.55 | 0.90 | 1800 | 57.8 | Measurement impossible | Measurement impossible | Measurement impossible | Measurement impossible | Measurement impossible |

EXAMPLES 2-3

Example 1 was repeated except that the amounts of HYCAR ® ATBN 1300×16 and hexamehylene-1,6-bis-carbamidocaprolactam in component B were changed as shown in Table 2. The results are shown in Table 2.

TABLE 2

| Example | a/c | Amount of HMBCCL (g) | Amount of HYCAR ATBN 1300 × 16 (g) | b/c | Rate of polymerization (seconds) | Polymerization conversion (%) | Tensile strength (kg/cm$^2$) | Tensile modulus (kg/cm$^2$) | Flexural strength (kg/cm$^2$) | Flexural modulus (kg/cm$^2$) | Izod impact strength (notched) (kg-cm/cm) |
|---|---|---|---|---|---|---|---|---|---|---|---|
| 2 | 0.77 | 47.2 | 100 | 2.17 | 50 | 96.5 | 623 | 24200 | 809 | 21500 | 21.5 |
| 3 | 0.51 | 76.1 | 150 | 2.33 | 50 | 96.4 | 545 | 15800 | 493 | 13800 | 46.3 |

EXAMPLE 4

Sodoium methylate powder having a purity of 95% (8.17 g) was added to 500 g of substantially anhydrous epsilon-caprolactam heated at 100° C., and in the same way as in Example 1, a solution containing 19.4 g of sodium caprolactam was prepared (component A).

Hexamethylene diisocyanate (47.8 g) was added to 300 g of substantially anhydrous epsilon-caprolactam heated at 120° C., and they were fully mixed. Then, 200 g of HYCAR ® ATBN 1300×13 was added, and the mixture was stirred at the same temperature in a nitrogen gas atmosphere to form component B.

The components A and B were mixed with stirring, and by the same way as in Example 1, a molded article was prepared. Its properties were as follows:
Rate of polymerization: 30 seconds
Polymerization conversion: 96.4%
Tensile strength: 416 kg/cm$^2$
Tensile modulus: 11300 kg/cm$^2$
Flexural strength: 460 kg/cm$^2$
Flexural modulus: 10400 kg/cm$^2$
Izod impact strength (notched): 118.6 kg-cm/cm

EXAMPLE 5

A component A tank of a nylon RIM molding apparatus was charged with 4 kg of component A prepared as in Example 1 and 1 kg of milled glass fibers (a product of Central Glass Co., Ltd., EFH 100-31), and they were uniformly mixed at 120° C. with stirring.

A component B tank was charged with 2.4 kg of epsilon-caprolactam and 32.6 g of hexamethylene diisocyanate. They were mixed, and then 1.13 kg of HYCAR ® ATBN 1300×16 and 1 kg of milled glass fibers (EFH 100-31) were added. They were mixed uniformly at 120° C. with stirring.

Components A and B were mixed by collision in a volume ratio of 1:1, and the mixture was injected into a mold having an inner capacity of 560 cc (400 mm long, 350 mm wide, 4 mm thick) and heated at 145° C. from a mixing head. Three minutes later, the die was opened, and the resulting molded article was taken out. The properties of the molded articles were as follows:
Polymerization conversion: 96.7%
Tensile strength: 596 kg/cm$^2$
Tensile modulus: 32500 kg/cm$^2$
Izod impact strength (notched, thickness 4 mm): 16.3 kg-cm/cm

EXAMPLE 6

To 500 g of substantially anhydrous epsilon-caprolactam heated at 100° C. was added 13.7 g of methyl magnesium bromide (used as an about 15% by weight tetrahydrofuran solution). The by-product methane and the tetrahydrofuran solvent were removed under reduced pressure to prepare component A.

Component B was prepared by adding 100 g of HYCAR ® ATBN 1300×21 (amine equivalent 1200, acrylonitrile content 10% by weight) and 26.9 g of terephthaloyl-bis-caprolactam to 400 g of epsilon-caprolactam heated at 100° C., and stirring the mixture fully at the same temperature in a nitrogen atmosphere.

The components A and B were mixed with stirring, and by the same method as in Example 1, a molded article was prepared, and its properties were measured. The results were as follows:
Rate of polymerization: 35 seconds
Polymerization conversion: 96.4%
Tensile strength: 605 kg/cm$^2$
Tensile modulus: 23700 kg/cm$^2$
Flexural strength: 800 kg/cm$^2$
Flexural modulus: 21400 kg/cm$^2$
Izod impact strength (notched): 25.7 kg-cm/cm

EXAMPLE 7

Sodium hydride (60% oily; 3.5 g) was added to 500 g of substantially anhydrous caprolactam heated at 100° C., and they were reacted to form a solution containing 19.7 g of sodium caprolactam (component A).

Component B was prepared by adding 150 g of HYCAR ® ATBN 1300×16 to a mixture of 40.2 g of xylylene diisocyanate and 350 g of substantially anhydrous caprolactam heated at 120° C.

The components A and B were mixed, and a molded article was prepared in the same way as in Example 1. A test specimen, 5 cm long, 5 cm wide and 2.5 mm thick, was cut out from the molded article. The specimen was dried under reduced pressure at about 60° C. for 48 hours and then immersed in water at 23° C. The amount of water absorption and dimensional change of the specimen were measured. The results are shown in Table 3.

COMPARATIVE EXAMPLE 4

Example 7 was repeated except that the amount of xylylene diisocyanate was changed to 44.7 g, and polyoxypropylenediamine (tradename Jeffamine D-2000, a product of Mitsui Texaco Chemical Co.; amine equivalent 1000). The amount of water absorption and dimensional change of the resulting polyamide-polyether copolymer were measured as in Example 7. The results are shown in Table 3.

TABLE 3

| Immersion period | 5 days | | 10 days | |
|---|---|---|---|---|
| Items determined | Amount of water absorption (wt. %) (*1) | Dimensional change (%) (*2) | Amount of water absorption (wt. %) | Dimensional change (%) |
| Example 7 | 3.3 | 0.34 | 4.9 | 0.95 |
| Comparative Example 4 | 6.0 | 1.30 | 7.5 | 1.90 |

(*1): The amount of water absorption is calculated as follows:

$$\frac{\left(\begin{array}{c}\text{Weight of the}\\\text{specimen im-}\\\text{mersed in water}\end{array}\right) - \left(\begin{array}{c}\text{Weight of the}\\\text{specimen before}\\\text{immersion}\end{array}\right)}{\left(\begin{array}{c}\text{Weight of the specimen}\\\text{before immersion}\end{array}\right)} \times 100$$

(*2): The dimensional change (%) is calculated as follows:

$$\frac{\left(\begin{array}{c}\text{Size of the}\\\text{specimen im-}\\\text{mersed in water}\end{array}\right) - \left(\begin{array}{c}\text{Size of the}\\\text{specimen before}\\\text{immersion}\end{array}\right)}{\left(\begin{array}{c}\text{Size of the specimen}\\\text{before immersion}\end{array}\right)} \times 100$$

What is claimed is:

1. A process for producing a lactam copolymer, which comprises copolymerizing an omega-lactam and a diene polymer having an amino or imino group at molecular ends by the action of an alkaline catalyst and a polyfunctional co-catalyst, the proportions of the components satisfying the following equations (I) and (II)

$$a/c > \tfrac{1}{2} \tag{I}$$

$$b/c > 1 \tag{II}$$

wherein a, b and c represent the equivalent weights of the alkaline catalyst, the polyfunctional co-catalyst and the diene polymer, respectively, per equivalent of omega-lactam.

2. The process of claim 1 wherein the diene polymer having an amino or imino group at molecular ends is in an amount of 1 to 60% by weight based on the weight of the omega-lactam.

3. The process of claim 1 wherein the diene polymer having an amino or imino group at molecular ends is in an amount of 3 to 50% by weight based on the weight of the omega-lactam.

4. The process of claim 1 wherein the diene polymer having an amino or imino group at molecular ends is in an amount of 5 to 30% by weight based on the weight of the omega-lactam.

5. The process of claim 1 wherein the amount of the alkali catalyst satisfies the following equation (III)

$$5 > a/c > \tfrac{1}{2} \tag{III}$$

wherein a and c are as defined.

6. The process of claim 1 wherein the amount of the polyfunctional co-catalyst satisfies the following equation (IV)

$$6 > b/c > 1 \tag{IV}$$

wherein b and c are as defined.

7. The process of claim 1 wherein the omega-lactam has 4 to 12 carbon atoms.

8. The process of claim 1 wherein the omega-lactam is epsilon-caprolactam.

9. The process of claim 1 wherein the diene polymer is liquid at the melting temperature of the omega-lactam.

* * * * *

UNITED STATES PATENT AND TRADEMARK OFFICE
CERTIFICATE OF CORRECTION

PATENT NO. : 4,691,004
DATED : September 1, 1987
INVENTOR(S) : M. Nishiyama and Y. Hirano It is certified that error appears in the above—identified patent and that said Letters Patent are hereby corrected as shown below:

Cover Page, Column 1: Assignee: reads
"Allied Corporation, Morris Township, Morris County, N.J."

Assignee: should read

--Ube Industries, Ltd., Tokyo, Japan--.

Signed and Sealed this

Fourteenth Day of June, 1988

Attest:

DONALD J. QUIGG

Attesting Officer

Commissioner of Patents and Trademarks